3,290,395
CHLORINATION OF UNSATURATED ALCOHOLS IN THE SUBSTANTIAL ABSENCE OF WATER AND IN THE PRESENCE OF HYDROGEN CHLORIDE
Georg Bohm and Wilhelm Dietrich, Marl, Germany, assignors to Chemische Werke Huls Aktiengesellschaft, Kreis Recklinghausen, Germany
No Drawing. Filed May 18, 1964, Ser. No. 368,416
Claims priority, application Germany, Oct. 13, 1962, C 28,175; Aug. 3, 1963, C 30,619
6 Claims. (Cl. 260—633)

This application is a continuation-in-part of our application Serial No. 303,932, filed August 22, 1963 (and now abandoned).

It is known that dichloroalkyl alcohols can be made by the addition of chlorine to the corresponding alkenols. The process used heretofore gives only moderate yields because in the course of the reaction, substitution and condensation reactions occur simultaneously with the desired chlorine addition reaction. By chlorination in the presence of aqueous hydrochloric acid or in the presence of an acid and a water binding agent it has been attempted to confine the side reactions within certain limits (see German Patents Nos. 1,132,109 and 1,093,345). However, operation with the relatively large amounts of aqueous hydrochloric acid required is especially disadvantageous. In the bromination reaction (German Patent No. 1,089,743) with the use of such acid and water binding agents the yield of the desired dibromoalkyl alcohol, e.g. 2,3-dibromopropanol-(1) is noticeably increased but in the chlorination reaction the effect is relatively small.

In said application Ser. No. 303,932 a process is described for the production of 1,2-dichloropropanol-(3) by the addition of chlorine to allyl alcohol, the chlorination being carried out in the presence of at least 7% by weight of hydrogen chloride at low temperature and under highly anhydrous conditions.

In the further development of this chlorination process it was found that in general other mono-and poly-ethylenically unsaturated aliphatic and cycloaliphatic mono and polyvalent alcohols containing more than 3 carbon atoms could be used instead of the allyl alcohol.

The saturated chlorinated alkyl alcohols which heretofore were difficult to make or obtainable in only poor yields can now be made, in accordance with the present invention in a technically simple manner and in good yields.

The starting material for the process of the present invention may be a singly or poly unsaturated, primary, secondary or tertiary mono or multivalent alcohol. The position of the double bond or bonds and/or the position of the hydroxyl group or groups has not noticeable effect upon the utility of the process.

Examples of alcohols that are suitable for use in the process are allyl alcohol, methallyl alcohol, crotyl alcohol, allyl carbinol, vinylmethyl carbinol, pentenols, hexenols, cyclohexenol, hexadienol, octenol, cyclododecenol, unsaturated alcohols having from 14 to 20 carbon atoms such as oleyl alcohol, butendiol and hexendiols.

In order to obtain good results the unsaturated alcohol, the hydrogen chloride and the chlorine should be as free as possible of water, i.e., the reaction should take place in the substantial absence of water. Small amounts of water e.g. 0.1 to 0.5% by weight do not interfere with the production of a technically pure product but the use of starting materials that are as free as possible of water is preferred. The unsaturated alcohol preferably is cooled, prior to the chlorination, to a temperature below 0° C. and then at least 7% by weight of hydrogen chloride and preferably sufficient to effect saturation is introduced.

When the hydrogen chloride concentration is substantially below the saturation limit the yield of chlorinated product is strongly affected by the chlorination temperature. The introduction of the hydrogen chloride and/or the chlorination can be carried out in the presence of an inert solvent such as tetrahydrofuran, dioxan or carbon tetrachloride. The presence of solvents is unavoidable when the alcohol to be chlorinated is solid at the chlorination temperature.

The hydrogen chloride and/or the chlorine treatment may be carried out at normal or superatmospheric pressure.

The need for the use of superatmospheric pressure which at the same time increases the absorption of the hydrogen chloride depends upon the compound to be chlorinated and can be determined by a preliminary test.

The temperature of the treatment with hydrogen chloride and/or chlorine may be within the range from $+25°$ C. to $-95°$ C. or even lower. For most compounds the range from $-10°$ C. to $-65°$ C. is preferred. Lower temperatures increase the solubility of the hydrogen chloride and reduce the undesired side reactions.

The amount of chlorine to be introduced depends upon the unsaturated alcohol to be treated. Suitably one mole of chlorine is introduced per double bond to be chlorinated. The addition of the chlorine can take place in either the presence or absence of light of all wave lengths or other actinic rays as well as in the presence or absence of catalysts such as metal chlorides, peroxides, pyridine or iodine.

The preferred embodiment of the invention is carried out under the exclusion of light and in the absence of catalyst. At the end of the reaction the reaction mixture is worked up in known manner by distillation, suitably with the recovery of the hydrogen chloride.

The sequence of steps of the process i.e. treatment with hydrogen chloride, chlorination, recovery of hydrogen chloride and distillation can be carried out continuously.

The alcohols, chlorinated in neighboring positions, produced by the process are useful as intermediate products. The side-by-side location of the chlorine and hydroxyl groups in the molecule is especially useful for the production of epoxides.

*Example 1*

232 parts by weight of allyl alcohol (99.0% pure containing 0.8% water) is charged into a chlorinating vessel equipped with a stirrer as well as an inlet and an outlet and cooled to $-15°$ C. and at this temperature is saturated with about 160 parts by weight of hydrogen chloride. Then 284 parts by weight of chlorine is introduced over a period of from 60 to 70 minutes. The temperature is maintained at $-12$ to $-15°$ C. by external cooling. During the chlorination a portion of the hydrogen chloride is expelled from the solution. After the end of the introduction of chlorine the reaction mixture is extensively freed of hydrogen chloride by subjecting it to a weak vacuum at 30 to 35° C. and is then subjected to vacuum distillation in a packed column 0.2 m. high. After a small first running 409 parts by weight of 1,2-dichloro-propanol-(3) are distilled at 84–86° C. and at a pressure of 20 mm. of mercury. This represents a yield of 79.2%. The product has a saponification number of 851 (theoretical 868) and an acid number of 1.8.

With the use of 70 parts by weight of hydrogen chloride the yield of the 1,2-dichloro-propanol-(3) is 71.5% and by the use of 115 parts by weight of hydrogen chloride the yield is 77.6% of the theoretical yield. In the presence of 23 parts by weight of hydrogen chloride, under the conditions of Example 1 the yield of 1,2-dichloro-propanol-(3) is 58.2%.

Example 2

The same charge of allyl alcohol as in Example 1 was saturated with 270 parts by weight of hydrogen chloride under a pressure of 1070 mm. Hg at −20° C. and the chlorination was carried out at this temperature and pressure. The reaction mixture was worked up as described in Example 1 and 430 parts by weight of 1,2-dichloro-propanol-(3) i.e. a yield of 83.2% having a saponification number of 853 and an acid number of 1.7 were recovered.

Example 3

The saturation with hydrogen chloride and the chlorination are carried out as in Example 2 at −20° C. and under a pressure of 1070 mm. Hg. At the end of the chlorination the hydrogen chloride is separated in a film evaporator at 30–40° C. under a weak vacuum. The crude product is then distilled in a film evaporator equipped with a fractionating column at a pressure of 15–18 mm. Hg. In this way 446 parts by weight (yield 86.4%) of 1,2-dichloro-propanol-(3) are recovered.

Example 4

320 parts by weight of hydrogen chloride are introduced into 232 parts by weight of allyl alcohol at −45° C. and at a pressure of 920 mm. Hg. Then 284 parts by weight of chlorine are introduced with further cooling so that the temperature is maintained at −45° C. The product is worked up as described in Example 1. After the distillation 468 parts by weight of 1,2-dichloro-propanol-(3), a yield of 90.7% having a saponification number of 849 is produced.

Example 5

144 parts by weight of crotyl alcohol (B.P. 120–121° C.; bromine number 245; OH number 770) was charged into a chlorination vessel equipped with a stirrer and wtih inlet and outlet pipes and cooled to −45° C. and saturated at this temperature with 153 parts by weight of hydrogen chloride. Then 142 parts by weight of chlorine was introduced over a period of 75 minutes with stirring. The temperature of −45° C. was maintained by external cooling. After the chlorination the hydrogen chloride was expelled from the reaction mixture by gradual heating up to 30° C. under a slight vacuum and the remainder was subjected to vacuum distillation in a .2 m. column. After a small forerunning 240 parts by weight of 2,3-dichlorobutanol-(1) (84% of theory) was distilled at a boiling range of from 98 to 102° C. and 22 mm./Hg pressure. The characteristic values of this product were $n\ 20/D=1.4782$, OH number=389 (theory=391) and a chlorine content=49.6% (theory=49.65%). At a chlorination temperature of −20° C. and with HCl saturation the yield was 71% of the theoretical yield; at −45° C. in the presence of 90 parts by weight of hydrogen chloride the yield was 77% of the theoretical.

Example 6

500 parts by weight of hydrogen chloride was introduced into a mixture of 176 parts by weight of butene-(2)-diol-(1,4) (B.P.$_{22}$=150–153° C.; $n\ 20/D=1.4793$) and 250 parts by weight of tetrahydrofuran at −50° C. and under a pressure of 900 torrs. Then 142 parts by weight of gaseous chlorine was introduced with stirring and while maintaining the temperature at −50 C. The resulting reaction mixture was worked up as described in Example 5, the solvent being recovered. 278 parts by weight of 2,3-dichlorobutane-diol-(1,4) having a boiling point at 1 mm./Hg per cm.$^2$ pressure of 140–144° C. was recovered. This was 87.5% of the theoretical yield. The characteristic numbers of the product were $n\ 20/D=1.5065$, chlorine content=44.4% (theory=44.6%) and molecular weight 161 (theory=159).

When the chlorination was carried out in a solution saturated with HCl at a temperature of −35° C. the yield was lowered to 82%. When 250 parts by weight of hydrogen chloride was introduced at −50° C. the yield was 79%.

Example 7

A mixture of 268 parts by weight of oleyl alcohol (B.P.$_{0.5}$ 170–172° C., iodine number 92.5) and 200 parts by weight of tetrahydrofuran was saturated with 180 parts by weight of hydrogen chloride at 0°–5° C. Then 71 parts by weight of chlorine was introduced over a period of 80 minutes with stirring. The temperature was maintained at −2° to −5° C. by cooling. After the separation of the hydrogen chloride as well as the solvent there remained 335 parts by weight of a crude 9,10-dichlorooctadecanol-(1) having a chlorine content of 20.3% (theory 20.9%) and an OH number of 156 (theory 165).

We claim:

1. Process for the production of chlorinated alcohols which comprises reactiong an alcohol selected from the group consisting of allyl alcohol, methallyl alcohol, crotyl alcohol, allyl carbinol, vinylmethyl carbinol, pentenols, hexenols, cyclohexenol, hexadienol, octenol, cyclododecanol, oleyl alcohol, butenediol and hexenediols with chlorine at a temperature within the range from −95° C. to +25° C. and in the substantial absence of water and in the presence of at least 7% by weight of hydrogen chloride based on the weight of the alcohol.

2. Process as defined in claim 1 in which the reaction is carried out at a temperature within the range from −10° C. to −65° C.

3. Process as defined in claim 1 in which the alcohol is allyl alcohol.

4. Process as defined in claim 1 in which the alcohol is crotyl alcohol.

5. Process as defined in claim 1 in which the alcohol is butene-(2)-diol-(1,4).

6. Process as defined in claim 1 in which the alcohol is oleyl alcohol.

References Cited by the Examiner

UNITED STATES PATENTS 3,037,059   5/1962   Kaiser _____ 260—633

LEON ZITVER, *Primary Examiner.*

J. E. EVANS, *Assistant Examiner.*